(12) United States Patent
Cummins et al.

(10) Patent No.: US 8,172,194 B2
(45) Date of Patent: May 8, 2012

(54) APPARATUS FOR TRANSPORT OF EQUIPMENT AND METHOD FOR MANUFACTURE THEREOF

(75) Inventors: David S. Cummins, Georgetown, TX (US); Curt A. Jackson, Austin, TX (US); James N. Cook, Jr., Round Rock, TX (US)

(73) Assignee: Toppan Photomasks, Inc., Round Rock, TX (US)

( * ) Notice: Subject to any disclaimer, the term of this patent is extended or adjusted under 35 U.S.C. 154(b) by 333 days.

(21) Appl. No.: 12/471,089

(22) Filed: May 22, 2009

(65) Prior Publication Data

US 2010/0294174 A1    Nov. 25, 2010

(51) Int. Cl.
*F16M 1/00* (2006.01)
(52) U.S. Cl. ..................................... 248/618; 108/57.12
(58) Field of Classification Search ............. 108/144.11, 108/145, 106, 57.12, 136; 248/618, 622, 248/584, 157, 421, 581; 267/217, 241, 242, 267/245, 256, 113, 118
See application file for complete search history.

(56) References Cited

U.S. PATENT DOCUMENTS

| | | | | |
|---|---|---|---|---|
| 3,994,017 A | | 11/1976 | Barkhuff et al. ................ | 360/98 |
| 4,589,620 A | | 5/1986 | Sakamoto ....................... | 248/550 |
| 4,764,075 A | * | 8/1988 | Cox et al. ....................... | 108/136 |
| 4,887,537 A | | 12/1989 | Kellogg ......................... | 108/55.1 |
| 5,058,852 A | * | 10/1991 | Meier et al. .................... | 248/588 |
| 5,141,261 A | | 8/1992 | Ziu .............................. | 285/138 |
| 5,222,709 A | | 6/1993 | Culley, Jr. et al. ............ | 248/421 |
| 5,366,048 A | | 11/1994 | Watanabe et al. ............. | 188/267 |
| 5,454,451 A | | 10/1995 | Kawamata et al. ........... | 188/267 |
| 6,237,795 B1 | | 5/2001 | Buckley et al. ................ | 220/1.5 |
| 6,286,805 B1 | | 9/2001 | Bunn et al. ..................... | 248/544 |
| 6,382,369 B1 | | 5/2002 | Lisenker ..................... | 188/267.2 |
| 6,866,236 B2 | * | 3/2005 | Mullinix et al. .............. | 248/421 |
| 6,923,298 B2 | | 8/2005 | Tanner .......................... | 188/267 |
| 7,383,923 B2 | * | 6/2008 | Patten et al. .................. | 187/269 |
| 7,413,158 B1 | * | 8/2008 | Burer ............................ | 248/564 |
| 2001/0035600 A1 | | 11/2001 | St. Clair ....................... | 267/131 |

FOREIGN PATENT DOCUMENTS

| | | |
|---|---|---|
| DE | 8801675 | 2/1989 |
| GB | 858457 | 10/1957 |
| GB | 1100123 | 3/1966 |

OTHER PUBLICATIONS

Invitation to Pay Additional Fees and Communication Relating to the Results of the Partial International Search; PCT/US2010/035510; pp. 5, Aug. 5, 2010.
International Search Report and Written Opinion; PCT/US2010/035510; pp. 21, Sep. 27, 2010.
International Preliminary Report on Patentability; PCT/US2010/035510; pp. 12, dated Dec. 1, 2011.

* cited by examiner

*Primary Examiner* — A. Joseph Wujciak, III
(74) *Attorney, Agent, or Firm* — Baker Botts L.L.P.

(57) ABSTRACT

An apparatus for transporting equipment and a method for the manufacture of the apparatus are disclosed. A damping assembly configured to dampen movement of a first item relative to a second item may include an arm and a shock absorber. The arm may be configured to be located between the first item and the second item and may be configured to pivotally couple to the first item and configured to slidably couple to the second item. The shock absorber may be configured to couple between the first item and the arm, such that the shock absorber dampens rotation of the arm to dampen movement of the first item relative to the second item.

41 Claims, 4 Drawing Sheets

APPARATUS FOR TRANSPORT OF EQUIPMENT AND METHOD FOR MANUFACTURE THEREOF

TECHNICAL FIELD

This disclosure relates in general to transport of equipment and, more particularly, to reducing mechanical shock associated with transporting sensitive equipment.

BACKGROUND OF THE DISCLOSURE

Many industries rely on any number of large and sophisticated items of equipment to assist in the design, development, testing, and/or verification of products. For example, in the photolithography industry, sophisticated equipment is often used to detect fabrication defects in photomasks and/or semiconductor wafers patterned from photomasks. Often, such items of equipment must be manufactured within strict tolerances, and are therefore typically susceptible to mechanical vibration and shock. Accordingly, when such items are transported, measures must be taken to reduce mechanical vibration and shock inherent in transportation that may damage the transported equipment.

However, traditional approaches to transportation of large, sensitive items of equipment have many disadvantages. For example, to reduce mechanical vibration and shock, equipment moved within a facility is often moved slowly (e.g., at less than 3 miles per hour). However, such an approach is impractical for transcontinental and/or transoceanic transport of equipment, which must necessarily occur at greater speeds and unpredictable conditions (e.g., "bumpy" roads and highways, varying traffic conditions, harsh seas, airplane landings, airplane takeoffs, airplane turbulence, etc.). To better protect equipment for transcontinental and/or transoceanic transport of equipment, many types of pallets and crates have been developed, but most have been found to not provide adequate protection to the equipment, resulting in costly repairs.

SUMMARY OF THE DISCLOSURE

In accordance with the present disclosure, the disadvantages and problems associated with transporting sensitive equipment have been reduced or eliminated.

In accordance with an embodiment of the present disclosure, an apparatus for transporting equipment may include a first platform having a substantially planar first surface, a second platform having a substantially planar second surface substantially parallel to the first surface, and a damping assembly. The second platform may be mechanically coupled to the first platform via a plurality of compression springs allowing movement of the second platform relative to the first platform. The damping assembly may be configured to dampen movement of the second platform relative to the first platform. The damping assembly may include an arm and a shock absorber. The arm may be located between the first surface and the second surface and may be pivotally coupled to the first platform and slidably coupled to the second platform. The shock absorber may be coupled between the first platform and the arm, such that the shock absorber dampens rotation of the arm to dampen movement of the second platform relative to the first platform.

In accordance with another embodiment of the present disclose, a damping assembly configured to dampen movement of a first item relative to a second item may include an arm and a shock absorber. The arm may be configured to be located between the first item and the second item and may be configured to pivotally couple to the first item and configured to slidably couple to the second item. The shock absorber may be configured to couple between the first item and the arm, such that the shock absorber dampens rotation of the arm to dampen movement of the first item relative to the second item.

In accordance with a further embodiment of the present disclosure, a method of manufacture is provided. The method may include providing a first platform having a substantially planar first surface. The method may also include providing a second platform having a substantially planar second surface substantially parallel to the first platform. The method may additionally include mechanically coupling the second surface to the first surface via a plurality of compression springs allowing movement of the second platform relative to the first platform. The method may further include pivotally coupling an arm to the first platform. Moreover, the method may include slidably coupling the arm to the second platform. The method may also include coupling a shock absorber between the first platform and the arm, such that the shock absorber dampens rotation of the arm to dampen movement of the second platform relative to the first platform.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE DISCLOSURE

Preferred embodiments of the present disclosure and their advantages are best understood by reference to FIGS. 1 through 4, where like numbers are used to indicate like and corresponding parts.

Figure 1:
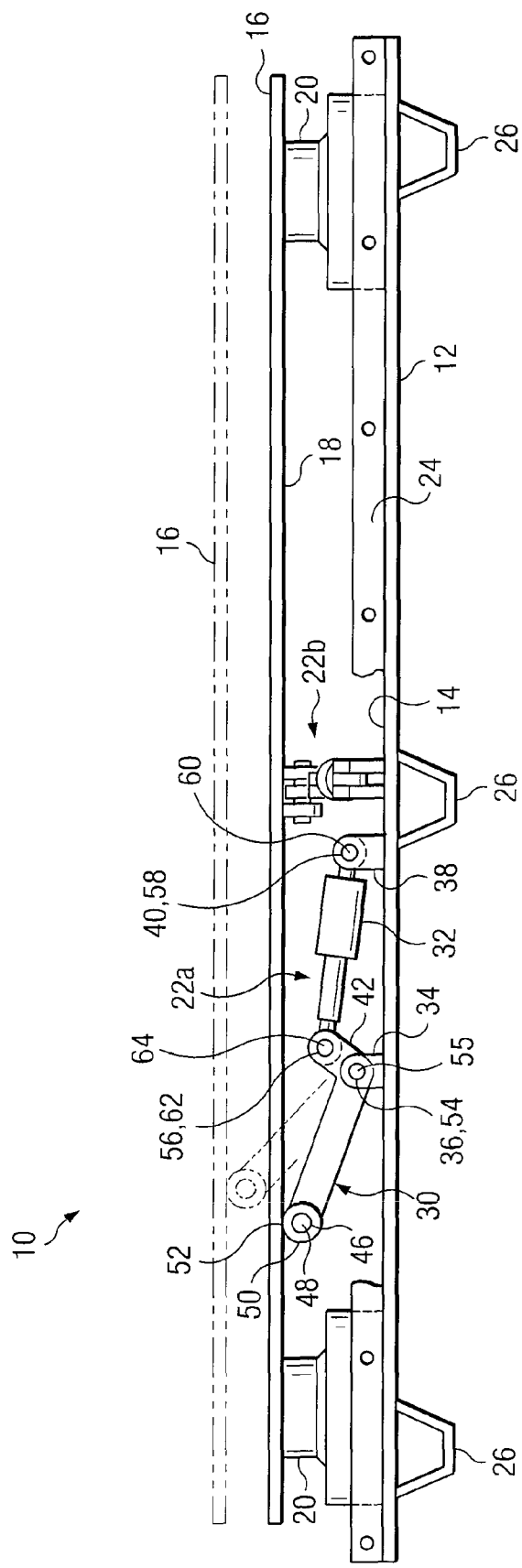
FIG. 1 illustrates an elevation view of an equipment transport apparatus, according to one or more embodiments of the present disclosure.
Figure 2:
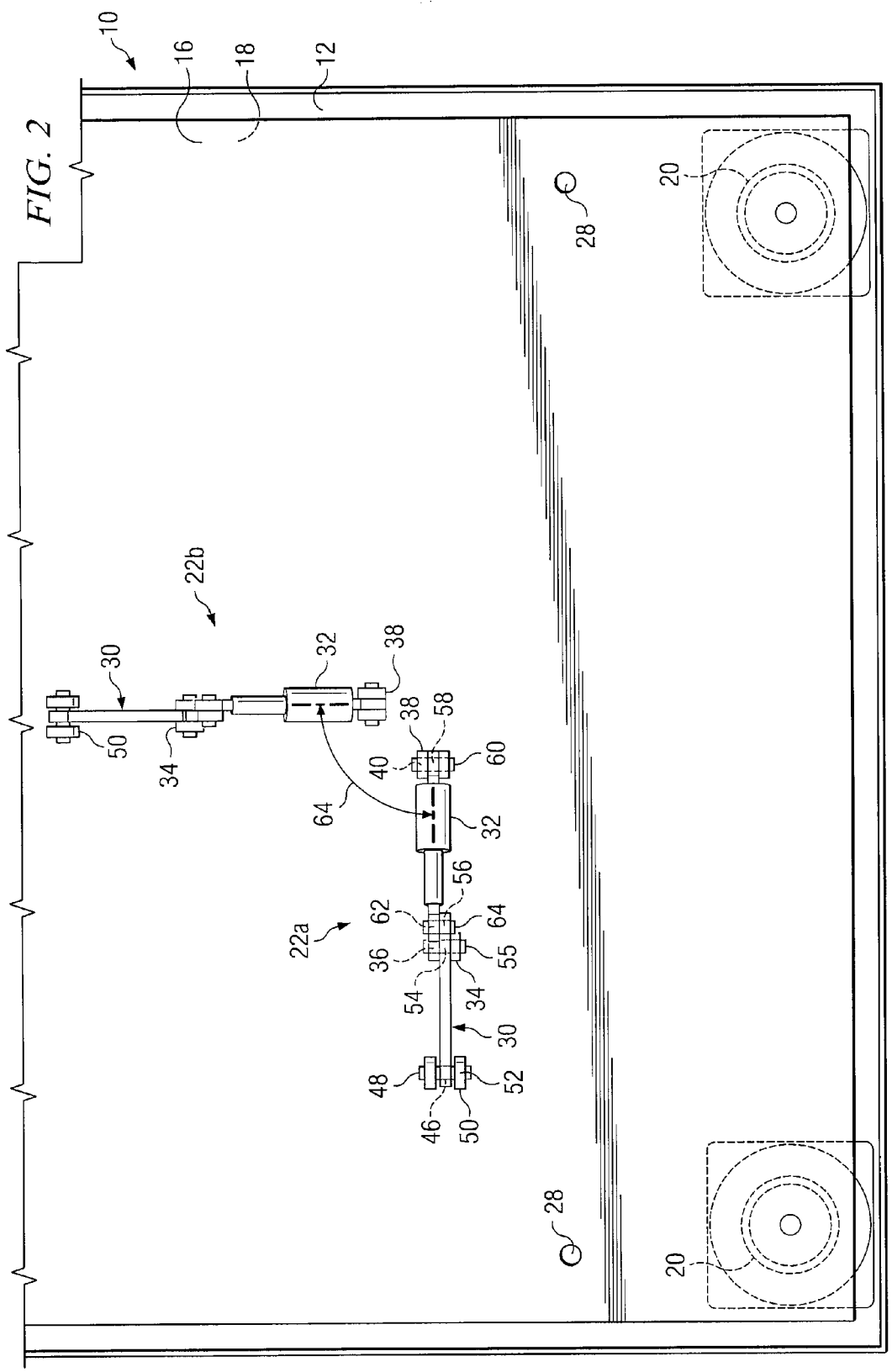
FIG. 2 illustrates a plan view of the equipment transport apparatus depicted in FIG. 1, according to one or more embodiments of the present disclosure.
Figure 3:
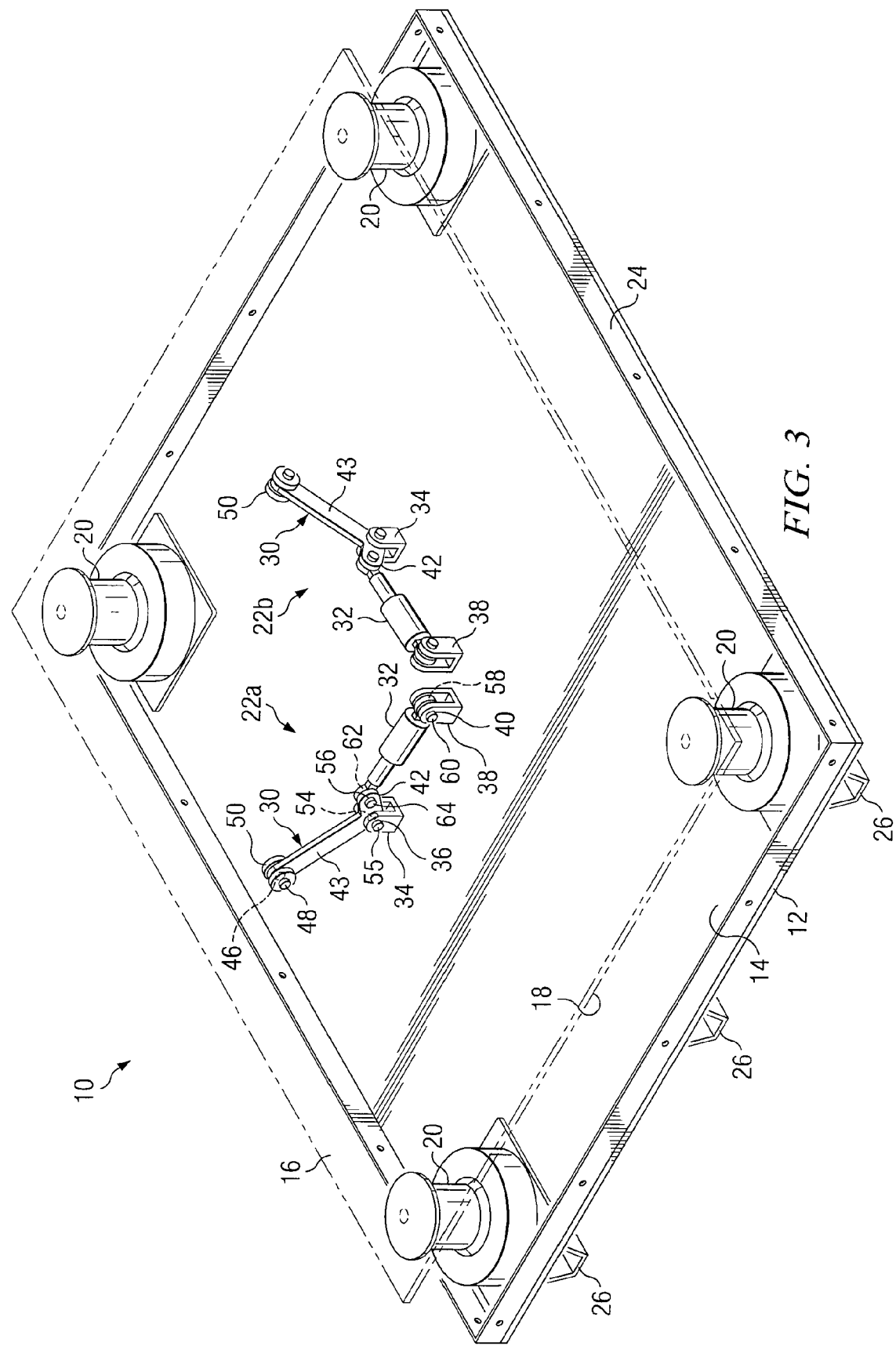
FIG. 3 illustrates an isometric view of the equipment transport apparatus depicted in FIG. 1, according to one or more embodiments of the present disclosure.
Figure 4:
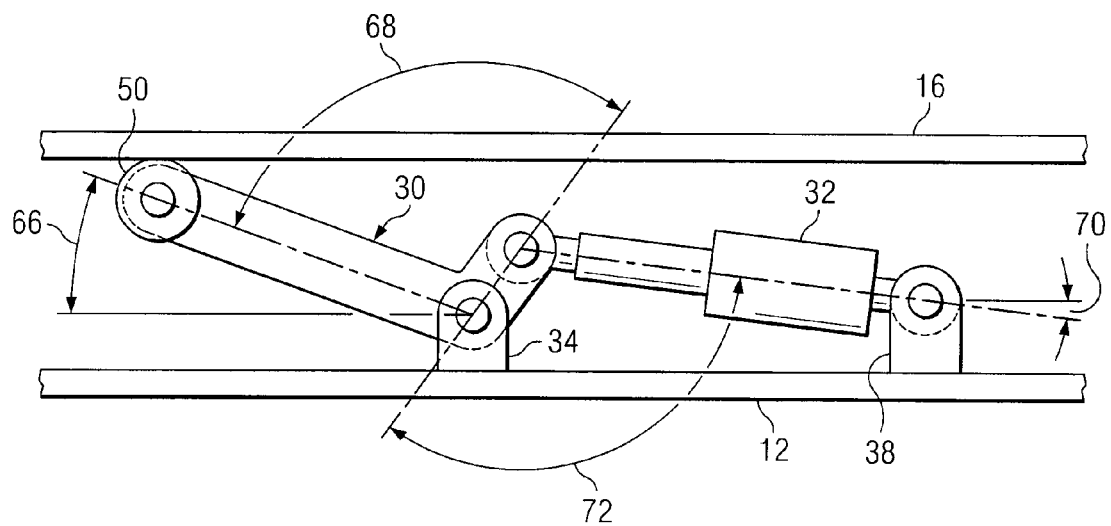
FIG. 4 illustrates a close up elevation view of certain elements of the equipment transport apparatus depicted in FIG. 1, according to one or more embodiments of the present disclosure.

FIGS. 1-4 illustrate various views of an equipment transport apparatus 10, according to one or more embodiments of the present disclosure. FIG. 1 illustrates an elevation view, FIG. 2 illustrates a plan view, FIG. 3 illustrates an isometric view, and FIG. 4 illustrates a close up elevation view.

As depicted in FIGS. 1-4, apparatus 10 may include a first platform 12, a second platform 16, compression springs 20, damping assemblies 22a and 22b (which may be referred to herein individually as "damping assembly 22" and collectively as "damping assemblies 22"), skirt 24, and reliefs 26.

Each of first platform 12 and second platform 16 may include and/or may be constructed from any suitable material for transporting equipment and may be of any suitable dimensions. Such material may be selected based on one or more factors, including without limitation weight, durability, flexibility, temperature expansion, compatibility with equipment being transported, ferromagnetic or non-ferromagnetic properties, etc. In some embodiments, one or more of first platform 12 and second platform 16 may comprise aluminum. Dimensions of first platform 12 and second platform 16 may be selected based on one or more factors, including without limitation the size of the equipment to be transported, the weight of the equipment to be transported, the sensitivity of the equipment to be transported, etc.

As depicted in FIGS. 1-4, first platform 12 may include a substantially planar first surface 14. First surface 14 may have coupled thereto pivot support members 34 and 38. Each pivot support member 34, 38 may be configured to pivotally couple another component of apparatus 10 to first platform 12, as described in greater detail below. For example, pivot support members 34 and 38 may include openings 36 and 40, respectively, configured to receive a bearing, wherein other components of apparatus 10 may pivot about the bearing, as described in greater detail below.

Second platform 16 may include a substantially planar second surface 18. Second platform 16 may be mechanically coupled to first platform 12 via compression springs 20 that allow controlled movement of second platform 16 relative to first platform 12 (e.g., compression springs 20 will resist compression of second platform 16 relative to first platform 12 in a direction perpendicular to the first surface). As shown in FIGS. 1-4, second platform 16 may include mounting openings 28. In operation, an item of equipment may be placed on a surface of second platform 16 opposite of second surface 18, and mounting openings 28 may receive screws, bolts, or other fasteners configured to mount equipment to second platform 16 for transport. Although FIGS. 1-4 depict apparatus 10 having four mounting openings 28, apparatus 10 may include any suitable number of mounting openings 28.

In certain embodiments, second platform 16 may be coupled to first platform 12 such that second surface 18 is substantially parallel to first surface 14. In some embodiments, at least one of the compression springs 20 may comprise a gas spring (e.g., a Barrymount SLM-12 mount). In the same or alternative embodiments, each of compression springs 20 may be individually tuned (e.g., tuning of the compression resistance of each spring) to account for any weight non-uniformity of equipment to be transported. Although FIGS. 1-4 depict apparatus 10 having four compression springs 20, apparatus 10 may include any suitable number of compression springs 20.

Each damping assembly 22 may be configured to dampen movement of second platform 16 relative to first platform 12. In some embodiments, each damping assembly 22 may be configured to dampen movement of second platform 16 relative to first platform 12 in an axis substantially perpendicular to first surface 14 (e.g., dampening vertical movement of second platform 16 relative to first platform 12). In the same or alternative embodiments, each damping assembly 22 may be configured to dampen movement of second platform 16 relative to first platform 12 in an axis substantially parallel to first surface 14 (e.g., dampening horizontal movement of second platform 16 relative to first platform 12). In the same or alternative embodiments, damping assembly 22a may be configured to dampen movement of second platform 16 relative to first platform 12 in a first axis substantially parallel to first surface 14 and damping assembly 22b may be configured to dampen movement of second platform 16 relative to first platform 12 in a second axis substantially parallel to first surface 14 and substantially perpendicular to the first axis (e.g., such that damping assembly 22a and damping assembly 22b cooperate to dampen in all three normal axes). Although FIGS. 1-4 depict apparatus 10 having two damping assemblies 22, apparatus 10 may include any suitable number of damping assemblies 22.

As shown in FIGS. 1-4, each damping assembly 22 may include an arm 30 and a shock absorber 32. Arm 30 may be pivotally coupled to first platform 12 and slideably coupled to second platform 16, such that arm 30 is located between first surface 14 and second surface 18. Arm 30 may include an elbow 42, a first extension 43 extending from elbow 42, and a second extension 44 nonparallel to first extension 43 and extending from the elbow 42.

Elbow 42 may include an opening 54 configured to receive bearing 55 to pivotally couple arm 30 to first platform 12 via pivot support member 34. First extension 43 may include, at an end distal to elbow 42, an opening 46 configured to receive a bearing 48. One or more wheels 50, each having a circumferential surface 52, may be coupled via their axes to arm 30 via opening 46 and bearing 48. Accordingly, at least a portion of circumferential surface 52 may be coupled to second surface 18, thus slideably coupling arm 30 to second platform 16. Second extension 44 of arm 30 may include, at an end distal to elbow 42, an opening 56 configured to receive bearing 62 to pivotally couple shock absorber 32 to arm 30, as described in greater detail below. In certain embodiments, an arm angle 68 defined by first extension 43 and second extension 44 may be approximately 106 degrees. Although first extension 43 is depicted in FIGS. 1-4 as being longer than second extension 44, each of first extension 43 and second extension 44 may be of any suitable length, and the length of first extension 43 relative to the length of second extension 44 may be of any suitable ratio.

Shock absorber 32 may include any mechanical device designed to smooth out or damp shock impulse, and dissipate kinetic energy (e.g., a Penske 8300 shock absorber). Shock absorber 32 may be coupled between first platform 12 and arm 30, such that shock absorber dampens rotation of arm 30 to dampen movement of second platform 16 relative to first platform 12. As shown in FIGS. 1-4, shock absorber 32 may include an opening 62 configured to receive a bearing 64 to pivotally couple arm 30 to shock absorber 32 via opening 56. In the same or alternative embodiments, shock absorber 32 may include an opening 58 configured to receive a bearing 60 to pivotally couple shock absorber 32 to first platform 12 via pivot support member 38. In some embodiments, a pivot angle 72 defined by second extension 44 and the longitudinal axis of shock absorber 32 may be approximately 121 degrees.

In some embodiments, a damping assembly offset angle 64 may be approximately ninety degrees, wherein damping assembly offset angle is defined by a first line and a second line, the first line defined by a first point at which shock absorber 32 of damping assembly 22a is coupled to first platform 12 and a second point at which arm 30 of damping assembly 22a is coupled to first platform 22a, and the second line defined by a third point at which shock absorber 32 of damping assembly 22b is coupled to first platform 12 and a fourth point at which arm 30 of damping assembly 22b is coupled to first platform 12.

Skirt 24 may be coupled first platform 12, and may be made of any suitable material. Skirt 24 may include one or more openings configured to receive screws, bolts, or other fasteners to allow a crate or other shipping container to be coupled to apparatus 10 (e.g., for shipping and transport).

Reliefs 26 may be coupled to first platform 12, and may be configured to offset first platform 12 from the ground, floor, or other surface to permit a forklift or other vehicle to lift and transport apparatus 10. Although FIGS. 1-4 depict apparatus 10 having three reliefs 26, apparatus 10 may include any suitable number of reliefs 26.

Using the methods and systems disclosed herein, problems associated with conventional approaches to transporting sensitive items of equipment may be improved, reduced, or eliminated. For example, compression springs 20 of apparatus 10 may provide mechanical elasticity between first platform 12 and second platform 16, thus providing resistance to mechanical shock and vibration, while one or more damping assemblies 22 may provide damping of oscillations produced by compression springs 22, thus further reducing mechanical shock and vibration. Accordingly, in certain embodiments, the deflection of second platform 16 in a direction substantially perpendicular to bottom surface 18 may not exceed approximately 2.34 inches.

In addition, damping assemblies 22 may be oriented relative to first platform 12 and second platform 16 such to create a low vertical profile during transport. For example, a damping assembly angle 66 defined by top surface 14 of first platform 12 and first extension 43 may be approximately 39 degrees in an unloaded state. In the same or alternative embodiments, damping assembly angle 66 may be approximately 20 degrees in a loaded state. As another example, a shock absorber angle 70 defined by bottom surface 18 of second platform 16 and the longitudinal axis of shock absorber 32 may be approximately 4 degrees in an unloaded state. In the same or alternative embodiments, shock absorber angle 70 may be approximately 6 degrees in an unloaded state.

Such a low vertical profile may be useful when transporting equipment via certain shipping methods (e.g., when shipping via tractor trailer, as in some instances trailer heights are limited to 92 inches).

Although the present disclosure and its advantages have been described in detail, it should be understood that various changes, substitutions and alterations can be made herein without departing from the spirit and scope of the disclosure as defined by the following claims.

What is claimed is:

1. An apparatus for transporting equipment, comprising:
  a first platform having a substantially planar first surface;
  a second platform having a substantially planar second surface substantially parallel to the first surface, the second platform mechanically coupled to the first platform via a plurality of compression springs allowing movement of the second platform relative to the first platform; and
  a damping assembly configured to dampen movement of the second platform relative to the first platform, the damping assembly including:
    an arm located between the first surface and the second surface, the arm pivotally coupled to the first platform at an elbow and slidably coupled to the second platform, the arm including:
      a first extension extending from the elbow, the first extension having a first end distal relative to the elbow, the first end coupled to the second platform; and
      a second extension nonparallel to the first extension and extending from the elbow, the second extension having a second end distal relative to the elbow; and
    a shock absorber coupled between the first platform and the second end of the arm, such that the shock absorber dampens rotation of the arm to dampen movement of the second platform relative to the first platform.

2. An apparatus according to claim 1, the arm slidably coupled to the second platform via at least one wheel having an axis and a circumferential surface, the axis coupled to the arm and at least a portion of the circumferential surface of the at least one wheel coupled to the second surface.

3. An apparatus according to claim 1, the shock absorber pivotally coupled to the first platform.

4. An apparatus according to claim 1, the first surface having a pivot support member, the pivot support member having a bearing and an opening configured to receive the bearing, the bearing configured to pivotally couple the shock absorber to the first platform.

5. An apparatus according to claim 1, the first surface having a pivot support member, the pivot support member having a bearing and an opening configured to receive the bearing, the bearing configured to pivotally couple the arm to the first platform.

6. An apparatus according to claim 1, at least one of the plurality of compression springs comprising a gas spring.

7. An apparatus according to claim 1, wherein the compressive force of the plurality of springs is substantially perpendicular to the first surface.

8. An apparatus according to claim 1, wherein a damping assembly angle is less than approximately 39 degrees in an unloaded state, the damping assembly angle defined by the first surface and a line, the line defined by a first point at which the arm is coupled to the first platform and a second point at which the arm is coupled to the second platform.

9. An apparatus according to claim 1, the damping assembly further configured to dampen movement of the second platform relative to the first platform in an axis substantially perpendicular to the first surface.

10. An apparatus according to claim 9, the damping assembly further configured to dampen movement of the second platform relative to the first platform in an axis substantially parallel to the first surface.

11. An apparatus according to claim 1, further comprising a second damping assembly configured to dampen movement of the second platform relative to the first platform, the second damping assembly including:
  a second arm located between the first surface and the second surface, the second arm pivotally coupled to the first platform and slidably coupled to the second platform; and
  a second shock absorber coupled between the first platform and the second arm, such that the second shock absorber dampens rotation of the second arm to dampen movement of the second platform relative to the first platform.

12. An apparatus according to claim 11, the second damping assembly further configured to dampen movement of the second platform relative to the first platform with respect to an axis substantially perpendicular to the first surface.

13. An apparatus according to claim 12, the damping assembly further configured to dampen movement of the second platform relative to the first platform in a first axis substantially parallel to the first surface, and the second damping assembly further configured to dampen movement of the second platform relative to the first platform in a second axis substantially parallel to the first surface and substantially perpendicular to the first axis.

14. An apparatus according to claim 11, wherein a damping assembly offset angle is approximately ninety degrees, the damping assembly offset angle defined by a first line and a second line, the first line defined by a first point at which the shock absorber is coupled to the first platform and a second point at which the arm is coupled to the first platform, and the second line defined by a third point at which the second shock absorber is coupled to the first platform and a fourth point at which the second arm is coupled to the first platform.

15. An apparatus according to claim 1, the arm pivotally coupled to the shock absorber.

16. An apparatus for transporting equipment, comprising:
a first platform having a substantially planar first surface;
a second platform having a substantially planar second surface substantially parallel to the first surface, the second platform mechanically coupled to the first platform via a plurality of compression springs allowing movement of the second platform relative to the first platform; and
a damping assembly configured to dampen movement of the second platform relative to the first platform, the damping assembly including:
an arm located between the first surface and the second surface, the arm pivotally coupled to the first platform and slidably coupled to the second platform; and
a shock absorber coupled between the first platform and the arm, the arm pivotally coupled to the shock absorber, such that the shock absorber dampens rotation of the arm to dampen movement of the second platform relative to the first platform.

17. An apparatus according to claim 16, the arm slidably coupled to the second platform via at least one wheel having an axis and a circumferential surface, the axis coupled to the arm and at least a portion of the circumferential surface of the at least one wheel coupled to the second surface.

18. An apparatus according to claim 16, the shock absorber pivotally coupled to the first platform.

19. An apparatus according to claim 16, the first surface having a pivot support member, the pivot support member having a bearing and an opening configured to receive the bearing, the bearing configured to pivotally couple the shock absorber to the first platform.

20. An apparatus according to claim 16, the first surface having a pivot support member, the pivot support member having a bearing and an opening configured to receive the bearing, the bearing configured to pivotally couple the arm to the first platform.

21. An apparatus according to claim 16, at least one of the plurality of compression springs comprising a gas spring.

22. An apparatus according to claim 16, wherein the compressive force of the plurality of springs is substantially perpendicular to the first surface.

23. An apparatus according to claim 16, wherein a damping assembly angle is less than approximately 39 degrees in an unloaded state, the damping assembly angle defined by the first surface and a line, the line defined by a first point at which the arm is coupled to the first platform and a second point at which the arm is coupled to the second platform.

24. An apparatus according to claim 16, the damping assembly further configured to dampen movement of the second platform relative to the first platform in an axis substantially perpendicular to the first surface.

25. An apparatus according to claim 24, the damping assembly further configured to dampen movement of the second platform relative to the first platform in an axis substantially parallel to the first surface.

26. An apparatus according to claim 16, further comprising a second damping assembly configured to dampen movement of the second platform relative to the first platform, the second damping assembly including:
a second arm located between the first surface and the second surface, the second arm pivotally coupled to the first platform and slidably coupled to the second platform; and
a second shock absorber coupled between the first platform and the second arm, such that the second shock absorber dampens rotation of the second arm to dampen movement of the second platform relative to the first platform.

27. An apparatus according to claim 26, wherein a damping assembly offset angle is approximately ninety degrees, the damping assembly offset angle defined by a first line and a second line, the first line defined by a first point at which the shock absorber is coupled to the first platform and a second point at which the arm is coupled to the first platform, and the second line defined by a third point at which the second shock absorber is coupled to the first platform and a fourth point at which the second arm is coupled to the first platform.

28. An apparatus according to claim 26, the second damping assembly further configured to dampen movement of the second platform relative to the first platform with respect to an axis substantially perpendicular to the first surface.

29. An apparatus according to claim 28, the damping assembly further configured to dampen movement of the second platform relative to the first platform in a first axis substantially parallel to the first surface, and the second damping assembly further configured to dampen movement of the second platform relative to the first platform in a second axis substantially parallel to the first surface and substantially perpendicular to the first axis.

30. An apparatus for transporting equipment, comprising:
a first platform having a substantially planar first surface;
a second platform having a substantially planar second surface substantially parallel to the first surface, the second platform mechanically coupled to the first platform via a plurality of compression springs allowing movement of the second platform relative to the first platform; and
a damping assembly configured to dampen movement of the second platform relative to the first platform, the damping assembly including:
an arm located between the first surface and the second surface, the arm pivotally coupled to the first platform and slidably coupled to the second platform; and
a shock absorber coupled between the first platform and the arm, such that the shock absorber dampens rotation of the arm to dampen movement of the second platform relative to the first platform; and
a second damping assembly configured to dampen movement of the second platform relative to the first platform, the second damping assembly including:
a second arm located between the first surface and the second surface, the second arm pivotally coupled to the first platform and slidably coupled to the second platform; and
a second shock absorber coupled between the first platform and the second arm, such that the second shock absorber dampens rotation of the second arm to dampen movement of the second platform relative to the first platform,
wherein a damping assembly offset angle is approximately ninety degrees, the damping assembly offset angle defined by a first line and a second line, the first line defined by a first point at which the shock absorber is coupled to the first platform and a second point at which the arm is coupled to the first platform, and the second line defined by a third point at which the second shock absorber is coupled to the first platform and a fourth point at which the second arm is coupled to the first platform.

31. An apparatus according to claim 30, the arm slidably coupled to the second platform via at least one wheel having an axis and a circumferential surface, the axis coupled to the arm and at least a portion of the circumferential surface of the at least one wheel coupled to the second surface.

32. An apparatus according to claim 30, the shock absorber pivotally coupled to the first platform.

33. An apparatus according to claim 30, the first surface having a pivot support member, the pivot support member having a bearing and an opening configured to receive the bearing, the bearing configured to pivotally couple the shock absorber to the first platform.

34. An apparatus according to claim 30, the first surface having a pivot support member, the pivot support member having a bearing and an opening configured to receive the bearing, the bearing configured to pivotally couple the arm to the first platform.

35. An apparatus according to claim 30, at least one of the plurality of compression springs comprising a gas spring.

36. An apparatus according to claim 30, wherein the compressive force of the plurality of springs is substantially perpendicular to the first surface.

37. An apparatus according to claim 30, wherein a damping assembly angle is less than approximately 39 degrees in an unloaded state, the damping assembly angle defined by the first surface and a line, the line defined by a first point at which the arm is coupled to the first platform and a second point at which the arm is coupled to the second platform.

38. An apparatus according to claim 30, the damping assembly further configured to dampen movement of the second platform relative to the first platform in an axis substantially perpendicular to the first surface.

39. An apparatus according to claim 38, the damping assembly further configured to dampen movement of the second platform relative to the first platform in an axis substantially parallel to the first surface.

40. An apparatus according to claim 30, the second damping assembly further configured to dampen movement of the second platform relative to the first platform with respect to an axis substantially perpendicular to the first surface.

41. An apparatus according to claim 40, the damping assembly further configured to dampen movement of the second platform relative to the first platform in a first axis substantially parallel to the first surface, and the second damping assembly further configured to dampen movement of the second platform relative to the first platform in a second axis substantially parallel to the first surface and substantially perpendicular to the first axis.

\* \* \* \* \*